Patented Sept. 4, 1945

2,384,068

UNITED STATES PATENT OFFICE 2,384,068

MANUFACTURE OF AMINOALKYLIDENE SUCCINIC ACID DERIVATIVES

Franz Bergel and Aaron Cohen, Welwyn Garden City, England, assignors to Roche Products Limited, Welwyn Garden City, Hertfordshire, England No Drawing. Application August 19, 1942, Serial No. 455,383. In Great Britain August 20, 1941

7 Claims. (Cl. 260—465)

This invention describes the synthesis of N-substituted amino-alkylidene succinic acid derivatives, which consists in reacting aminoesters of the general Formula I with a derivative of a monoacylsuccinic acid of the Formula II.

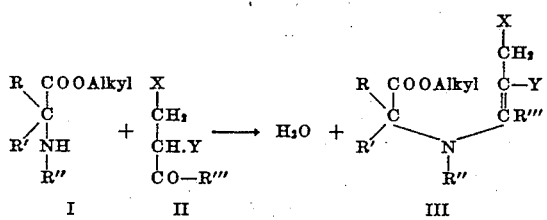

In Formula I, R and R', which are not necessarily identical, are hydrogen, alkyl, aryl, or aralkyl groups or such other groups as can be attached to the α-carbon atom of α-amino acids. R'' is hydrogen or an alkyl, aryl or aralkyl group. In Formula II, X and Y which may be identical or different are COO-alkyl or nitrile groups, and R''' is hydrogen, or an alkyl, aryl or aralkyl group. Thus formylsuccinic ester is represented by II where $X=Y=COOC_2H_5$, and $R'''=$ hydrogen.

The above reaction may be effected by mixing the reactants with or without external heating, whereby a molecular proportion of water is eliminated with the formation of the reaction product which is represented by the Formula III.

In some cases where the free acyl succinic acid derivative is more conveniently handled in the form of its alkali metal derivative preferably its potassium derivative, the reaction is carried out with the hydrochloride of the amino-acid ester.

The following examples, in which the parts are by weight, serve to illustrate how the invention may be carried into effect:

Example 1

8.1 parts of diethyl-α-formylsuccinate are mixed with 4.7 parts of the ethyl ester of α-alanine. The mixture immediately becomes warm and soon turns turbid with the separation of water. After the mixture has been kept at room temperature for about an hour, some benzene is added and the water is removed by distilling off the benzene, finally under reduced pressure. Alternatively, the water may be removed in the first place in the process of submitting the reaction mixture to vacuum distillation which yields the product as a clear pale yellow oil of boiling point approximately 155° C./0.05 mm. This is obtained in almost quantitative yield and has the constitution expressed by Formula III where $R=CH_3$, $R'=R''=R'''=H$, alkyl$=C_2H_5$, and $X=Y=COOC_2H_5$.

Example 2

8.5 parts of diethyl α-formylsuccinate are mixed with 4.5 parts of the methyl ester of α-alanine. Heat is immediately developed and water separates from the turbid oily mixture. The product is isolated as described in the preceding example and is again obtained in almost quantitative yield as a clear yellow oil of boiling point approximately 170° C./0.4 mm. This compound has the Formula III, in which $R=CH_3$, $R'=R''=R'''=H$, alkyl$=CH_3$, and $$X=Y=COOC_2H_5$$

Example 3

10.1 parts of diethyl α-formylsuccinate are mixed with 5.5 parts, or slightly more than the equivalent amount, of the ethyl ester of glycine. The product is isolated as described above and has a boiling point of about 175° C./0.6 mm. It has the Formula III, in which $$R=R'=R''=R'''=H, \text{ alkyl}=C_2H_5 \text{ and}$$

$$X=Y=COOC_2H_5$$

Example 4

A mixture of 10.8 parts of diethyl-α-acetylsuccinate and 5.5 parts of the ethyl ester of glycine is heated on the water-bath for 2 hours. Some water separates and this is removed by distilling with benzene. From the cooled mixture a small amount of diketopiperazine separates and this is removed by filtration. The resulting oil is fractionated under reduced pressure and after a fore-run of a small amount of unchanged diethyl-α-acetylsuccinate, the product is obtained as a pale yellow liquid boiling at approximately 185° C. at 0.6 mm. This has the Formula III in which $R=R'=R''=H$, alkyl$=C_2H_5$, $R'''=CH_3$ and $X=Y=COOC_2H_5$.

Example 5

5.65 parts of diethyl α-formylsuccinate are mixed with 3.7 parts of the ethyl ester of sarcosine. The hot mixture is treated as in Example 1 to isolate the product which is obtained in about 90% yield as a yellow liquid of boiling point 170° C./0.1 mm. This has the Formula III in which $R=R'=R'''=H$, $R''=CH_3$, alkyl$=C_2H_5$ and $X=Y=COOC_2H_5$.

Example 6

5 parts of diethyl α-formylsuccinate are mixed with 3 parts of methyl α-aminoisobutyrate. The mixture becomes warm and is treated as in Example 1 for the isolation of the product which has a boiling point of about 155–160° C./0.1 mm. It has the Formula III in which R=R'=CH₃, R''=R'''=H, alkyl=CH₃ and X=Y=COOC₂H₅.

Example 7

Equivalent amounts of diethyl α-formylsuccinate and the ethly ester of N-methylalanine are mixed and heat is developed. The mixture yields, on vacuum distillation, the product as a pale yellow oil of boiling point 157–160° C. at 0.1 mm. which has the Formula III in which R=CH₃, R'=R'''=H, R''=CH₃, alkyl=C₂H₅, and $$X=Y=COOC_2H_5$$

Example 8

13 parts of diethyl α-formylsuccinate are mixed with an equal weight of the ethyl ester of N-benzyl - alanine (ethyl α - benzylaminopropionate). The mixture becomes warm and is heated on the water bath for 2 hours. Water is removed by adding benzene and distilling off the latter. The residual oil is dried in vacuo and treated with anhydrous ether to precipitate a small amount of the diketopiperazine derivative corresponding to N-benzylalanine. This is filtered off, the ether removed by evaporation and the residual oil heated to about 150° C. at a pressure of less than 1 mm. to remove any unchanged diethyl α-formylsuccinate. The residual oil, about 22 parts, is substantially the required Product III in which R=CH₃, R'=R'''=H, $$R''=CH_2C_6H_5$$

alkyl=C₂H₅ and X=Y=COOC₂H₅.

Example 9

4 parts of ethyl-α-formyl-β-cyanopropionate (prepared by the condensation of ethyl formate with ethyl-β-cyanopropionate in the presence of sodium or potassium in a similar manner to the preparation of the known ethyl-α-formylsuccinate, boiling point=135° C. at 10 mm.) are mixed with 3.4 parts of the ethyl ester of α-alanine. The mixture becomes warm immediately and after standing at room temperature for a few hours is submitted to a vacuum distillation. The product obtained is an almost colourless oil having a boiling point of approximately 160° C. at 0.02 mm. It has the Formula III, in which R=CH₃, R'=R''=R'''=H, alkyl=C₂H₅, X=CN, and Y=COOC₂H₅. (Found: C=56.8; H=7.3; C₁₂H₁₈O₄N₂ requires C=56.7, H=7.1%.)

Example 10

The hydrochloride of the ethyl ester of glycine was mixed in a dry state with somewhat less than the equivalent amount of the potassium salt of formylsuccinonitrile. (This compound is prepared by the condensation of equivalent amounts of ethyl formate and succinonitrile in the presence of potassium ethylate in ethereal solution. Found: K=26.6, N=18.3; C₅H₃ON₂K requires K=26.5, N=19.0%.) It is convenient to use these salts of the reactants in this particular case because of the difficulty of purifying free formylsuccinonitrile. The dry mixture is heated at 100° C. for one hour, during which time neutralisation and condensation occur with the formation of a melt, cooled and extracted with ether. The ether extract is washed with water and dried, and after removal of the solvent the residue is warmed under reduced pressure to remove any unchanged glycine ester. The product is then obtained as a viscous oil and consists of the Compound III, in which R=R'=R''=R'''=H, alkyl=C₂H₅, $$X=Y=CN$$

Example 11

17.5 parts of dimethyl α-formylsuccinate are mixed with 19.5 parts of the methyl ester of N-benzylalanine (methyl α-benzyl-aminoproprionate). The mixture becomes warm spontaneously and is heated on the water-bath for 1 hour, preferably with the occasional addition of some benzene and application of reduced pressure to remove the water which separates. After cooling for several hours, the mixture is treated with ether to precipitate a small amount of diketopiperazine derivative (corresponding to N-benzylalanine) which is filtered off. The ethereal solution is washed with sodium bicarbonate solution, dried, evaporated and the residue distilled in a vacuum yielding, in good quantity, the product as a yellow oil of boiling point approximately 195° C./0.3 mm. It has the Formula III, in which R=CH₃, R'=R'''=H, R''=CH₂C₆H₅, alkyl=CH₃ and X=Y=COOCH₃.

Example 12

9.5 parts of methyl α-formyl-β-cyanopropionate (which has a boiling point of approximately 130° C./10 mm. and is prepared similarly to the ethyl ester used in Example 9, by the condensation of ethyl formate with methyl β-cyanopropionate in the presence of sodium, potassium, or their alcoholates) are mixed with 13 parts of the methyl ester of N-benzylalanine. The mixture becomes warm and is worked up as described in Example 11. The product distils at about 205° C./0.4 mm. as a golden yellow oil. It has the Formula III, in which R=CH₃, R'=R'''=H, R''=CH₂C₆H₅, alkyl=CH₃, X=CN, Y=COOCH₃.

The methyl ester of N-benzylalanine used as starting material in Examples 11 and 12 is prepared as follows. Equimolecular amounts of benzaldehyde and alanine methyl ester are mixed. The mixture becomes warm and is kept at 45–50° C. for about 45 minutes. The cloudy mixture is treated during this period with portions of anhydrous sodium sulphate to remove water formed. It is then decanted and the sodium sulphate washed with ether; the washings are combined with the reaction mixture, dried with sodium sulphate for some hours, filtered and freed from ether. The residual oil is dissolved in 4 parts of methanol and shaken with hydrogen in the presence of palladised charcoal. When about 1 molecular proportion of hydrogen has been absorbed, the solution is filtered from the catalyst, the methanol removed and the residue distilled, yielding the methyl ester of N-benzylalanine, or methyl α-benzylaminopropionate, as a colourless liquid of boiling point 130–133° C./10 mm.

Example 13

The dry potassium salt of formylsuccinonitrile is mixed with a slight excess over the molecular equivalent of the hydrochloride of methyl α-benzylaminopropionate, and the mixture is treated on a boiling water bath under reduced pressure for 2 hours. It is then cooled and shaken with ether and water. The ethereal extract is washed with sodium bicarbonate solution, water, and dried. After removal of the ether, the residue is distilled in a good vacuum yielding the product as a golden yellow oil of boiling point about 175–180° C./0.005 mm. It has the Formula III, where R=CH₃, R'=R'''=H, R''=CH₂.C₆H₅, X=Y=CN and alkyl=CH₃.

We claim:

1. A process for the manufacture of an N-substituted aminoalkylidene succinic acid compound selected from the group consisting of esters and nitriles of the general formula:

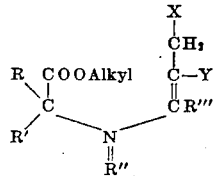

which comprises reacting an amino ester of the general formula:

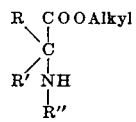

with a monoacylsuccinic acid compound selected from the group consisting of esters and nitriles of the general formula:

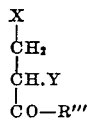

where R, R' and R''' are selected from the group consisting of hydrogen and alkyl, and R'' is selected from the group consisting of hydrogen, alkyl and aralkyl radicals, X is selected from the group consisting of COO-alkyl and nitrile radicals, and Y is selected from the group consisting of COO-alkyl and nitrile radicals.

2. A process for the manufacture of an N-substituted aminoalkylidene succinic acid compound selected from the group consisting of esters and nitriles of the general formula:

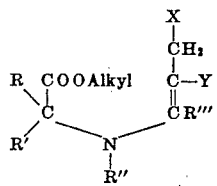

which comprises reacting by heating an amino ester of the general formula:

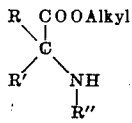

with a monoacylsuccinic acid compound selected from the group consisting of esters and nitriles of the general formula:

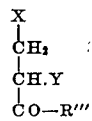

where R, R' and R''' are selected from the group consisting of hydrogen and alkyl, and R'' is selected from the group consisting of hydrogen, alkyl and aralkyl radicals, X is selected from the group consisting of COO-alkyl and nitrile radicals, and Y is selected from the group consisting of COO-alkyl and nitrile radicals.

3. As new chemical substances, an N-substituted amino-alkylidene succinic acid compound selected from the group consisting of esters and nitriles of the general formula:

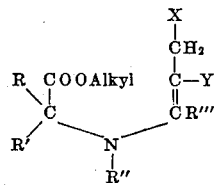

where R, R' and R''' are selected from the group consisting of hydrogen and alkyl, R'' is selected from the group consisting of hydrogen, alkyl, and aralkyl radicals, X is selected from the group consisting of COO-alkyl and nitrile radicals, and Y is selected from the group consisting of COO-alkyl and nitrile radicals.

4. As a new chemical substance an N-substituted amino-alkylidene succinic acid ester having the formula:

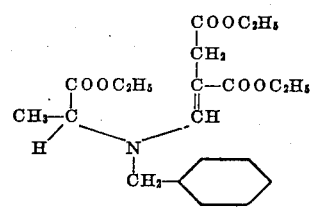

5. As a new chemical substance an N-substituted amino-alkylidene succinic acid ester having the formula:

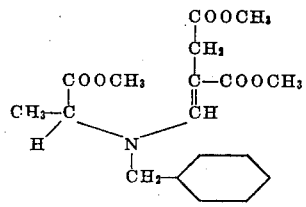

6. As a new chemical substance an N-substituted amino-alkylidene succinic acid nitrile having the formula:

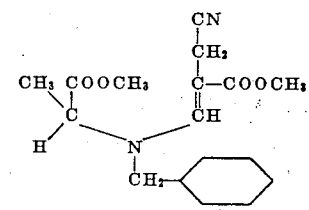

7. A process for the manufacture of an N-substituted amino-alkylidene succinic acid compound selected from the group consisting of esters and nitriles of the general formula:

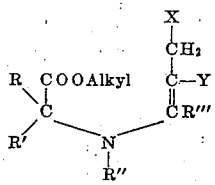

which comprises reacting the hydrochloride of an amino ester of the general formula:

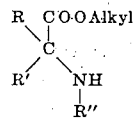

with an alkali metal compound of a monoacylsuccinic acid compound selected from the group consisting of esters and nitriles of the general formula:

$$\begin{array}{c} X \\ | \\ CH_2 \\ | \\ CHY \\ | \\ CO-R''' \end{array}$$

where R, R' and R''' are selected from the group consisting of hydrogen and alkyl, R'' is selected from the group consisting of hydrogen, alkyl, and aralkyl radicals, X is selected from the group consisting of COOAlkyl and nitrile radicals, and Y is selected from the group consisting of COO-Alkyl and nitrile radicals.

FRANZ BERGEL.
AARON COHEN.